United States Patent Office 3,636,076
Patented Jan. 18, 1972

3,636,076
N - FLUORODICHLOROMETHYLMERCAPTO - N-TRIFLUOROMETHYL - AMINO - BENZOIC ACID PHENYL ESTERS
Engelbert Kuhle, Berg-Gladbach, Erich Klauke, Odenthal-Hahnenberg, Brigitte Hamburger, Cologne, and Fritz Steinfatt, Opladen, Germany, assignors to Farbenfabriken Bayer Aktiengesellschaft, Leverkusen, Germany
No Drawing. Filed Mar. 24, 1970, Ser. No. 22,363
Claims priority, application Germany, Apr. 6, 1969,
P 19 19 180.1
Int. Cl. C07c *149/20*
U.S. Cl. 260—470        10 Claims

ABSTRACT OF THE DISCLOSURE

N - trihalogenmethylmercapto - N - trifluoromethyl-amino-benzoic acid phenyl esters, i.e. (optionally methyl, (trifluoromethyl, methoxy, chloro or nitro - substituted)- (N - trihalogenmethylmercapto-N-trifluoromethyl-amino)-benzoic acid (carboxy and alkoxycarbonyl-substituted)-phenyl esters, which possess pesticidal, especially anti-microbial, properties and which may be produced by conventional methods.

---

The present invention relates to and has for its objects the provision for particular new N-trihalogenmethylmercapto - N - trifluoromethyl - amino benzoic acid phenyl esters, i.e. (optionally methyl, trifluoromethyl, methoxy, chloro or nitro-substituted) - (N - trihalogenmethylmercapto - N - trifluoromethyl - amino) - benzoic acid (carboxy and alkoxycarbonyl - substituted) - phenyl esters, which possess pesticidal, especially anti-microbial, properties, active compositions in the form of mixtures of such compounds with solid and liquid dispersible carrier vehicles, and methods for producing such compounds and for using such compounds in a new way especially for combating pests, especially microbes, i.e. micro-organisms, with other and further objects becoming apparent from a study of the within specification and accompanying examples.

It is known that hydroxybenzoic acids, for example salicylic acid (A), 4 - hydroxy - benzoic acid, and derivatives of these acids are usable as anti-microbial agents in the most diverse fields (K. H. Wallhäusser and H. Schmidt: Sterilisation, Desinfektion, Konservierung, Chemotherapie, Georg Thieme-Verlag, Stuttgart 1967, p. 168). Among such anti-microbial agents are also o-hydroxy-diphenyl (B), benzoic acid (C), p-chloro-benzoic acid (D) and p-chlorometacresol.

Moreover, the fungicidal effectiveness of N - fluorodichloro - methylmercapto compounds in the crop protection and material protection fields is known (c.f. German Pats. 1,193,498 and 1,180,486).

It has now been found, in accordance with the present invention, that the particular new hydroxy-benzoic acid derivatives, substituted at the hydroxy group, i.e. N -trihalogenmethylmercapto - N - trifluoromethyl - aminobenzoic acid phenyl esters of the formula

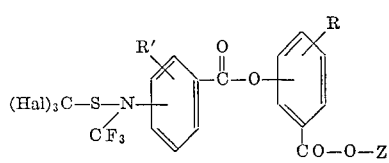

(I)

in which
Hal is fluoro or chloro,
R is hydrogen or halogen,
R' is hydrogen, methyl, trifluoromethyl, methoxy, chloro, or nitro, and
Z is hydrogen, or alkyl of 1–4 carbon atoms, exhibit strong pesticidal, especially anti-microbial, properties.

It has been furthermore found, in accordance with the present invention, that the particular new compounds of Formula I above may be produced by the process which comprises reacting a fluorocarbonyl-N-trihalomethylmercapto - N - trifluoromethyl - aniline of the formula

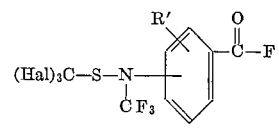

(II)

in which
Hal and R' are the same as defined above, with a hydroxybenzoic acid compound of the formula

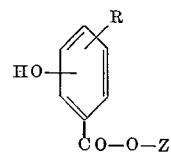

(III)

in which
R and Z are the same as defined above, in the presence of an acid-binding agent or with the corresponding alkali metal salt form of said hydroxybenzoic acid compound.

Surprisingly, the active compounds of Formula I above according to the present invention show a considerably higher anti-microbial activity than the chemically closest known active compounds of the same type of activity such as compounds (A) to (E) and 4-hydroxy-benzoic acid, noted above. The instant active compounds according to the present invention therefore represent a valuable contribution to the art.

The reaction course, when 4-fluorocarbonyl-N-fluorodichloro-methylmercapto - N - trifluoromethyl - aniline and salicylic acid are used as reactants, can be represented by the following scheme:

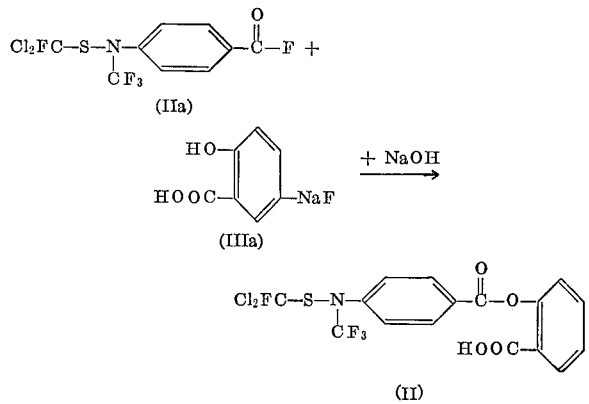

Advantageously, in accordance with the present invention, in the various formulae set forth herein:

(Hal)₃ represents fluorodichloro, such that the corresponding N-fluorodichloromethylmercapto-N-trifluoromethyl-amino moiety is a corresponding 2-, 3- or 4-position nuclear substituent;

R represents hydrogen;
R' represents
  hydrogen;
  methyl;
  trifluoromethyl;
  methoxy;
  chloro; or
  nitro;

such that the corresponding methyl, trifluoromethyl, methoxy, chloro or nitro moiety is a corresponding 2-, 3-, 4-, 5- or 6-position nuclear substituent, especially 3-, 4- and 5-position substituent with respect to the corresponding 2-, 3- or 4-position N-fluorodichloromethylmercapto-N-trifluoromethyl-amino substituent; and Z represents
  hydrogen; or
  straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl;

such that the corresponding —COOZ moiety is a 2-, 3- and 4-position nuclear substituent.

Preferably, $(Hal)_3$ is fluorodichloro; R is hydrogen; R' is hydrogen; or methyl; or trifluoromethyl; or methoxy; or chloro; or nitro; and Z is hydrogen; or $C_{1-3}$ or $C_{1-2}$ alkyl.

In particular, $(Hal)_3$ is fluorodichloro; R is hydrogen; R' is hydrogen; or methyl; or trifluoromethyl; or methoxy; or chloro; or nitro; and Z is hydrogen; or $C_{1-2}$ alkyl.

The fluorocarbonyl - N - trihalomethylthio-N-trifluoromethyl-anilines which may be used as starting materials are clearly characterized by Formula II above. Such starting materials are well known and may be prepared readily from fluorocarbonyl-N-trifluoromethyl-anilines and sulfenic acid chlorides (cf. Belgian Pat. 699,033).

Suitable starting fluorocarbonyl-N-trihalomethylmercapto-N-trifluoro-methyl-anilines include for example:

2-, 3- and 4-fluorocarbonyl-N-trifluoromethyl-
  mercapto-N-trifluoro-methyl-aniline,
2-, 3- and 4-fluorocarbonyl-N-dichlorofluoromethyl-
  mercapto-N-trifluoromethyl-aniline,
3-fluorocarbonyl-N-trifluoromethylmercapto-N-
  trifluoromethyl-aniline,
2-fluorocarbonyl-5-chloro-N-dichlorofluoromethyl-
  mercapto-N-trifluoromethyl-aniline,
3-fluorocarbonyl-5-nitro-N-dichlorofluoromethyl-
  mercapto-N-trifluoromethyl-aniline,
3-fluorocarbonyl-6-methoxy-N-dichlorofluoromethyl-
  mercapto-N-trifluoromethyl-aniline,
2-methyl-4-fluorocarbonyl-N-dichlorofluoromethyl-
  mercapto-N-trifluoromethyl-aniline, and the like.

The hydroxybenzoic acid compounds which may be used as starting materials are clearly characterized by Formula III above. Examples of such hydroxybenzoic acid compounds include salicylic acid, 5-chloro-salicylic acid, 5-bromo-salicylic acid, 3- and 4-hydroxy-benzoic acid, their salts, e.g. alkali metal salts (i.e. sodium, potassium, etc., salts), which are all known, and their methyl, ethyl, isopropyl or butyl esters, which are similarly all known.

The production reaction according to the present invention may be optionally carried out in the presence of a solvent (this term includes a mere diluent). Examples of such solvents include water, ketones (such as acetone), ethers (such as diethyl ether and dioxan), and aromatic (optionally chlorinated) hydrocarbons (such as benzene, toluene, xylene and chlorobenzene), and the like.

As appropriate, acid binders, i.e. acid binding agents, may be used, including any of the customary acceptors suitable for hydrogen fluoride. Preferred acid binders include sodium hydroxide, potassium hydroxide, sodium carbonate, pyridine, triethylamine, and the like.

The production reaction according to the present invention can be carried out within a fairly wide temperature range; the preferred range is substantially between about 50–140° C.

When carrying out the instant production process, it is preferred to use approximately equimorlar amounts of the hydroxybenzoic acid comound, acid-binding agent and fluorocarbonyl-N - trihalomethylmercapto - N - trifluoromethylaniline. Corresponding amounts greater or lesser by up to about 20% are possible without substantial loss of yield. The acid-binding agent, of course, may be dispensed with if the hydroxybenzoic acid compound is reacted in the form of its corresponding salt, preferably its alkali metal salt.

The working up of the reaction mixture and isolation of the end products may be effected in customary manner, as the artisan will appreciate.

Advantageously, the active compounds according to the present invention exhibit a strong anti-microbial activity, and are distinguished by a broad spectrum of activity. Their low toxicity to warm-blooded animals and their good compatibility with higher plants also permits the use of the instant compounds as crop protection agents against fungal diseases, insects and acarids.

The instant active compounds are therefore usable as microbicides for destroying and controlling microorganisms of animal and vegetable nature, such as bacteria and pathological protozoa, including mold fungi and yeasts.

By their superior anti-microbial activity, which extends to a broad scale of microorganisms, the compounds of the present invention are very well suited for many purposes of disinfection, preserving and anti-microbial finishing, especially in industrial plants.

Furthermore, a good algicidal activity against green algae, blue-green algae and diatoms has also been found for the instant active compounds.

Typical mold fungi contemplated herein include *Aspergillus niger, Penicillium camerunence, Paecilomyces*, and the like; whereas *Trichophyton* is a typical dermatophyte. Moreover, yeasts contemplated herein include for example Saccharomyces, Candida, and the like. Gram-negative and gram-positive bacteria as contemplated herein include *Escherichia coli, Bet. proteus, Pseudonm. pyocyanea, Staphylococcus aureus*, and the like.

More particularly, the instant active compounds are usable in controling slime formers in industrial waters, e.g. in the pulp paper industry, in controling mold growth in the leather tanning industry, in controlling bacteria, slime products and putrefaction products in lubricants used in the fiber spinning industry, in controlling microbial spoiling by mold growth in gum arabic adhesive solutions, in controlling bacteria and algae growth in industrial cooling waters, in controlling mold, enzymes and bacteria in leather finishing, in controlling mold infection in stored wood pulp, and the like.

Significantly, the active compounds of the present invention also have proven to be particularly effective in crop protection endeavors as insecticides and acaricides, as well as pesticidally effective against soil fungi and plant-pathogenic fungi, as for example *Piricularia oryzae* and *Pellicularia sasakii*, and pesticidally effective against plant-pathogenic bacteria, for example against Xanthomonas species.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, paste, soluble powder, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other microbicides, or fungicides, algicides, insecticides, acaricides, herbicides, bactericides, etc., if desired, or in the form of particular dosage preparations for specific application made therefrom, such as solutions, emulsions, suspensions, powders, pastes, and granules which are thus ready for use.

A concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0005–2.0%, preferably 0.001–0.1%, by weight of the mixture. Thus, the present invention contemplates over-all compositions which comprise mixtures of a conventional dispersible carrier vehicle such as (1) a dispersible finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.0005–95%, and preferably 0.001–95%, by weight of the mixture.

For general pesticidal purposes, e.g. in crop protection endeavors, the active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95% by weight of the active compound, or even the 100% active substance alone, e.g. about 20–100% by weight of the active compound.

Furthermore, the present invention contemplates methods of selectively killing, combating or controlling pests such as microbes, especially bacteria, mold, yeast, algae, slime, enzymes, fungi, insects, acarids, and the like, and more particularly methods of killing, combating or controlling microbes which comprise applying to at least one of (a) such microbes and (b) their habitat, i.e. the locus to be protected, especially a non-human habitat, e.g. surfaces and substrates of every inanimate or non-human animate type which are to be protected from damage from microbes, an anti-microbial or microbicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, watering, sprinkling, pouring, contacting, mixing, and the like.

It will be realized, of course, that the concentration of the particular active compound utilized in admixture with the carrier vehicle will depend upon the intended application. Therefore, in special cases, it is possible to go above or below the aforementioned concentration ranges.

The anti-microbial effectiveness of the active compounds according to the present invention is illustrated, without limitation, by the following examples.

EXAMPLE 1

Table 1 shows the excellent activity of the particular new hydroxybenzoic acids substituted at the hydroxy group, i.e. the compounds of Formula I above, in accordance with the instant invention, compared with an appropriate known aromatic carboxylic acid used at present for preserving purposes, i.e. salicylic acid (A). Table 1 contains, in respect of certain typical bacteria, mold fungi and yeasts, the reciprocal germination inhibition values. This value expresses the dilutions of the particular active compound at which the growth of the selected micro-organisms is completely inhibited when the compound is added to a nutrient substrate which is optimum for these organisms in accordance with the normal testing procedure.

The micro-organisms used for this test belong to various groups which generally occur very widely. These micro-organisms are known to be particularly resistant to chemical preserving and disinfecting agents. Thus, *Asperigillus niger, Penicillium camerunense* and Paecilomyces are representatives of very resistant mold fungi; Trichophyton is the very widespread dermatophyte; Saccharomyces and Candida belong to the yeasts which often occur as pathogenic forms; and *E. coli, Bct. proteus, Pseudonm, pyocyanea* and *Staphylococcus aureaus* belong to the gram-negative and gram-positive germs, respectively some of which are pathogenic.

The selected mold fungi, yeasts and bacteria mentioned above yield, when the particular active compounds according to the present invention are added, germination inhibition values which, from experience, would also be expected to occur in the case of many other related micro-organisms of these three groups mentioned above.

The particular active compounds of the present invention are identified in the left hand column of Table 1 (and in the other tables herein) by numbers corresponding to those of the formulae in Examples 9 and 10.

TABLE 1.—RECIPROCAL GERMINATION INHIBITION VALUES OF TYPICAL MICROBES

| Active compound | Asperg. niger | Penic. camerun. | Paeci- lomyces | Tricho- phyton mentagr. | Candida | Saccha- romyces | Pseudom.- pyocyan | Bct. proteus | Escheri- chia coli | Stc. aureus |
|---|---|---|---|---|---|---|---|---|---|---|
| (A) Salicylic acid (known) | <1,500 | <1,500 | <1,500 | <1,500 | <1,000 | <1,000 | <500 | <500 | <500 | <500 |
| ($1_2$) | 10,000 | 20,000 | 36,000 | >80,000 | >72,000 | >80,000 | 30,000 | 8,000 | >16,000 | 20,000 |
| ($2_1$) | <4,000 | <20,000 | 15,000 | >80,000 | 10,000 | 10,000 | 5,000 | <4,000 | <4,000 | <80,000 |
| ($3_1$) | 10,000 | 50,000 | 50,000 | >80,000 | >72,000 | >80,000 | 50,000 | 8,000 | 8,000 | >80,000 |
| ($4_1$) | 24,000 | 15,000 | 20,000 | >80,000 | 30,000 | 50,000 | 20,000 | 4,000 | 4,000 | >80,000 |
| ($5_1$) | 8,000 | 15,000 | >80,000 | >80,000 | >50,000 | >80,000 | 20,000 | 6,000 | 6,000 | >80,000 |
| ($6_1$) | 6,000 | 15,000 | 20,000 | >80,000 | 15,000 | >72,000 | 20,000 | 8,000 | 6,000 | >80,000 |
| ($7_1$) | 6,000 | 6,000 | 4,000 | 52,000 | 20,000 | >72,000 | 6,000 | 5,000 | 5,000 | 10,000 |
| ($8_1$) | 6,000 | 20,000 | 15,000 | >80,000 | 15,000 | 15,000 | 6,000 | 4,000 | 4,000 | >80,000 |
| ($9_1$) | 10,000 | 20,000 | 20,000 | >80,000 | 15,000 | 10,000 | 10,000 | 8,000 | 4,000 | 52,000 |
| ($10_1$) | 10,000 | 15,000 | 50,000 | >80,000 | 15,000 | 20,000 | 8,000 | 6,000 | 6,000 | 52,000 |
| ($11_1$) | 6,000 | 6,000 | 20,000 | >80,000 | 15,000 | 20,000 | 4,000 | 6,000 | <4,000 | 52,000 |
| ($12_1$) | 15,000 | 15,000 | 20,000 | >80,000 | 15,000 | 20,000 | 10,000 | 6,000 | <4,000 | 52,000 |
| ($13_1$) | 10,000 | 8,000 | 8,000 | 52,000 | 15,000 | 20,000 | 4,000 | <4,000 | <4,000 | 20,000 |

EXAMPLE 2

In water for manufacturing use which is circulated and employed for pulp preparation in a paper and board factory, which water has been exposed to a great extent to being overgrown with slime formers, the bacterial count is very greatly reduced by the use of compounds ($1_3$) and ($3_2$), respectively, at points particularly exposed to harm, such as pulp water, funnels, vats, in concentrations of 1:50,000 or 1:75,000 (with reference to the circulating water) as can be seen from the following summary in Table 2:

TABLE 2

Bacterial count per ml. of water

Count before addition _____ 8,000,000
Count after stated time after addition:
  15 minutes _____ 100
  30 minutes _____ 800
  60 minutes _____ 2,000
  24 hours _____ 120,000

By treatment three times, slime formation can be prevented. The above-mentioned compounds show no adverse side effects at the paper machine.

EXAMPLE 3

Natural tanning agent solutions which are strongly susceptible to mold are protected against becoming overgrown with mold by addition of the instant compounds, even in high dilution. The action of the instant compounds excels considerably the effect of o-hydroxy-diphenyl (B) which in the past has frequently been used for this preservation or protection purpose.

The following summary in Table 3 shows the results obtained, in terms of continued mold growth (+) or successful treatment (−):

TABLE 3

| Active compound | Concentra- tion, percent | Mold growth |
|---|---|---|
| (B) o-Hydroxydiphenyl (known) | 0.1 | + |
|  | 0.5 | + |
|  | 1.0 | − |
| ($1_4$) | 0.05 | − |
| ($3_3$) | 0.05 | − |
| ($5_2$) | 0.05 | − |
| ($6_2$) | 0.05 | − |

EXAMPLE 4

A lubricant used in the conventional fibre spinning process, consisting of mineral oil, fatty acid esters, anion-active emulsifiers and water, which in this composition is exposed to a great extent to being grown upon by bacteria, with the formation of slime products and putrefaction products, is protected by means of the compounds of the present invention against microbial growth and specifically against being grown upon by slime-forming bacteria, by the addition of 0.1% of instant compound ($1_5$).

An addition of even 0.5% benzoic acid (C), p-chlorobenzoic acid (D) or p-chloro-metacresol (E) is not able to prevent the development of bacteria and the microbial decomposition of such lubricant.

EXAMPLE 5

A 33% gum arabic adhesive solution which does not keep, when stored, without special preserving additives and which is particularly readily grown upon by mold, is protected from microbial spoiling by addition of 0.01 to 0.02% of instant active compounds ($1_6$), ($3_4$), ($5_3$) and ($10_2$).

EXAMPLE 6

Instant active compound ($1_7$) is added to the water circulated in a cooling tower. To the water flowing in are added batchwise 20 cc. of such active compound per cubic meter of inflowing water 3 times daily. As a result, the cooling tower remains free from growth of bacteria and algae whereas prior thereto such growth had proliferated.

EXAMPLE 7

Leather is impregnated with a solution of the particular active compounds in such a manner that, after evaporation of the solvent, 1 part of active compound remains on 100 parts of leather. The leather is in this way provided with an effective finish against becoming grown over with mold, enzymes and bacteria. The anti-microbial finish is substantially waterproof. Such finish has not only a growth-inhibiting action on the various microbes, but is also germicidal. This is important from a hygienic aspect, because the thus finished leather goods in the form of sandals and shoes also check the spread of pathogenic germs, e.g. dermatophytes and their attendant organisms.

The growth inhibition is illustrated on leather specimens of 2 x 2 cm. which are laid out on nutrient agar plates after the plates had been inoculated with *Aspergillus terreus*, *Candida albicans* and *Staphylococcus aureus* in accordance with normal procedures.

The following growth inhibition zones, measured in mm., then manifest themselves in the case of the specimens finished with the instant active compounds and watered for 24 hours at 45° C. For comparison, a finish with p-chloro-metacresol (E) is also used.

TABLE 7A

| Finish with 1% active compound | Inhibition zones in mm. of— | | |
|---|---|---|---|
|  | Aspergillus terreus | Candida albicans | Staphylo- coccus aureus |
| (E) p-Chloro-metacresol (known) | 0 | 0 | 0 |
| ($1_8$) | 10 | 14 | 14 |
| ($3_5$) | 9 | 5 | 15 |
| ($5_4$) | 12 | 4 | 11 |
| ($6_3$) | 4 | 5 | 12 |
| ($10_3$) | 5 | 5 | 8 |

By inoculation of leather specimens thus finished and additionally infected with *Staphylococcus aureus* and *Candida albicans*, after 24 and 48 hours a test is made for survival or for destruction of the inoculated germs, with the following results:

TABLE 7B

| Leather finished with 0.5 and 1% respectively, of active compound, percent | | Germ destruction result | | | |
|---|---|---|---|---|---|
| | | *Staphylococcus aureus* after— | | *Candida albicans* after— | |
| | | 24 hours | 48 hours | 24 hours | 48 hours |
| p-Chloro(E) metacresol (known) | 1.0 | − | − | − | − |
| (1₁) | 0.5 | − | + | + | + |
|  | 1.0 | − | + | + | + |
| (3₆) | 0.5 | + | + | + | + |
|  | 1.0 | + | + | + | + |
| (6₁) | 0.5 | − | + | + | + |
|  | 1.0 | + | + | + | + |

NOTE.—+ = Germ destruction; − = No destruction.

EXAMPLE 8

To prevent mold infection in wood pulp stored under moist conditions, an 0.01% solution of instant compounds (1₁₀), (3₇) and (5₅), respectively, in ethyl glycol is applied to the material. With this application, with reference to absolutely dry material, no mold formation occurs whereas without such treatment mold infection invariably occurs.

The following further examples are set forth to illustrate, without limitation, the process for producing the active compounds according to the present invention.

EXAMPLE 9

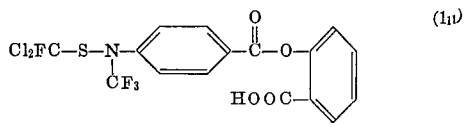
(1₁)

Preparation 34 g. (0.1 mol) 4-fluorocarbonyl-N-dichlorofluoromethylmercapto-N-trifluoromethyl-aniline and 16 g. (0.1 mol) sodium salicylate are heated to the boil in 100 ml. dioxan for 2 hours. After cooling, water is added and the separated oil is taken up in toluene. After drying of the toluene solution over sodium sulfate, the solvent is evaporated off in a vacuum on a water-bath.

As residue, there remain behind 43 g. (0.094 mol) of the above compound, i.e. 4-(N-fluorodichloromethylmercapto-N-trifluoromethyl-amino)-benzoic acid 2'-carboxyphenyl ester, in the form of a viscous golden-yellow oil. The refractive index is $n_D^{20} = 1.5536$.

EXAMPLE 10

In a manner analogous to that of Example 9, there are also obtained:

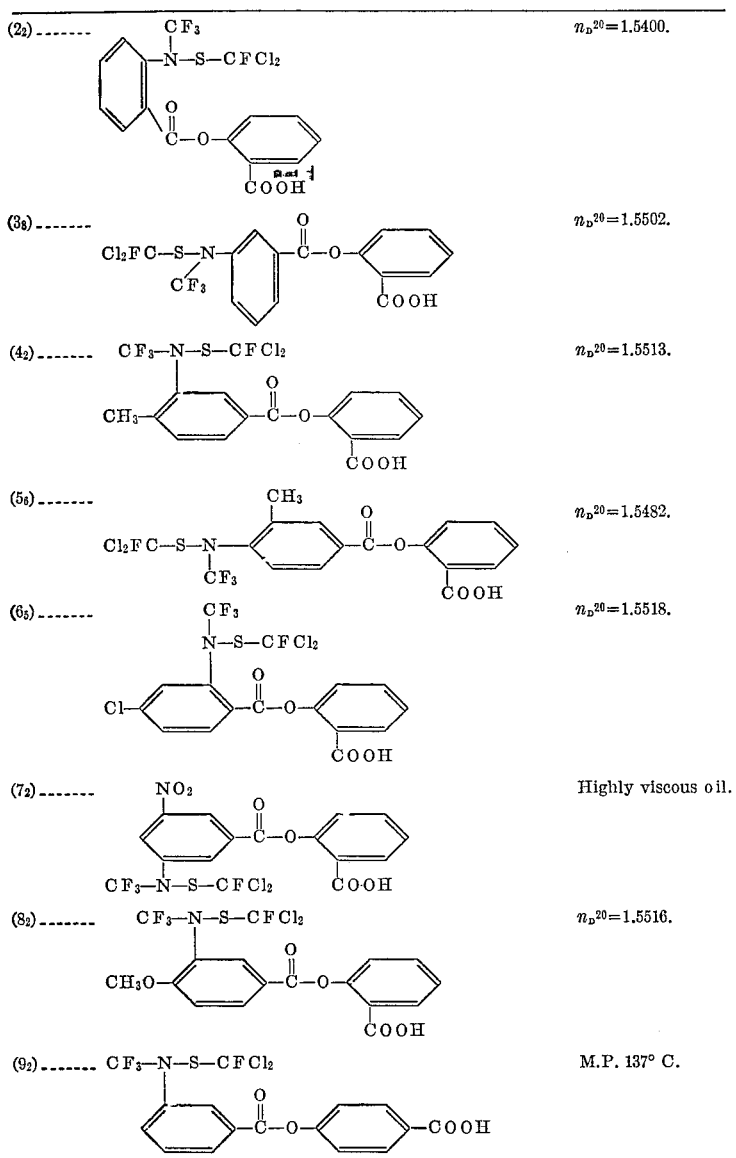

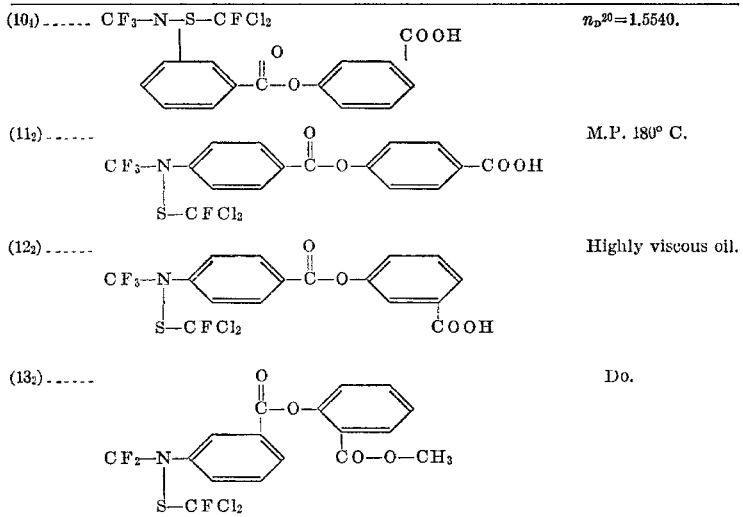

| | | |
|---|---|---|
| (10₁) | CF₃—N—S—CFCl₂, phenyl-C(O)-O-phenyl-COOH | $n_D^{20}=1.5540$. |
| (11₂) | CF₃—N(S—CFCl₂)—phenyl—C(O)—O—phenyl—COOH | M.P. 180° C. |
| (12₂) | CF₃—N(S—CFCl₂)—phenyl—C(O)—O—phenyl(COOH) | Highly viscous oil. |
| (13₂) | CF₃—N(S—CFCl₂)—phenyl(C(O)—O—phenyl)(CO—O—CH₃) | Do. |

The following compounds are particularly preferred:

(1) 4 - (N - fluorodichloromethylmercapto - N - trifluoromethylamino)-benzoic acid 2'-carboxy-phenyl ester
(2) 2 - (N - fluorodichloromethylmercapto - N - trifluoromethylamino)-benzoic acid 2'-carboxy-phenyl ester
(3) 3 - (N - fluorodichloromethylmercapto - N - trifluoromethylamino)-benzoic acid 2'-carboxy-phenyl ester
(4) 3 - (N - fluorodichloromethylmercapto - N - trifluoromethylamino)-4-methyl-benzoic acid 2'-carboxy-phenyl ester
(5) 3 - trifluoromethyl - 4 - (N-fluorodichloromethylmercapto - N - trifluoromethylamino)-benzoic acid 2'-carboxy-phenyl ester
(6) 2 - (N - fluorodichloromethylmercapto - N - trifluoromethylamino)-4-chloro-benzoic acid 2'-carboxy-phenyl ester
(7) 3 - (N - fluorodichloromethylmercapto - N - trifluoromethylamino) - 5 - nitro-benzoic acid 2'-carboxy-phenyl ester
(8) 3 - (N - fluorodichloromethylmercapto - N - trifluoromethylamino)-4-methoxy-benzoic acid 2'-carboxy-phenyl ester
(9) 3 - (N - fluorodichloromethylmercapto - N - trifluoromethylamino)-benzoic acid 4'-carboxy-phenyl ester
(10) 3 - (N - fluorodichloromethylmercapto - N-trifluoromethylamino)-benzoic acid 3'-carboxy-phenyl ester
(11) 4 - (N - fluorodichloromethylmercapto - N-trifluoromethylamino)-benzoic acid 4'-carboxy-phenyl ester
(12) 4 - (N - fluorodichloromethylmercapto - N-trifluoromethylamino)-benzoic acid 2'-carboxy-phenyl ester
(13) 3 - (N - fluorodichloromethylmercapto - N-trifluoromethylamino)-benzoic acid 2'-methoxycarbonyl-phenyl ester It will be realized by the artisan that all of the foregoing compounds contemplated by the present invention possess the desired strong anti-microbial or microbicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and higher plants for more effective control and/or elimination of pests, i.e. microbes, including bacteria, mold, yeast, algae, slime, enzymes, as well as fungi, insects and acarids, by application of such compounds to such pests and/or their habitat.

It will be appreciated that the instant specification and examples are set forth by way of illustration and not limitation, an that various modifications and changes may be made without departing from the spirit and scope of the present invention which is to be limited only by the scope of the appended claims.

What is claimed is:

1. N - trihalogenmethylmercapto - N - trifluoromethylamino-benzoic acid phenyl ester of the formula

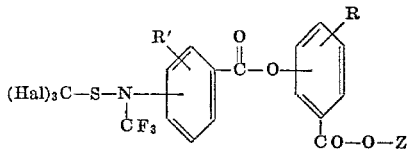

in which Hal is selected from the group consisting of fluoro and chloro, R is selected from the group consisting of hydrogen and halogeno, R' is selected from the group consisting of hydrogen, methyl, trifluoromethyl, methoxy, chloro and nitro, and Z is selected from the group consisting of hydrogen and alkyl of 1–4 carbon atoms.

2. Compound according to claim 1 wherein (Hal)₃ is fluorodichloro, R is hydrogen, R' is selected from the group consisting of hydrogen, methyl, trifluoromethyl, methoxy, chloro and nitro, and Z is selected from the group consisting of hydrogen and $C_{1-3}$ alkyl.

3. Compound according to claim 1 wherein (Hal)₃ is fluorodichloro, R is hydrogen, R' is selected from the group consisting of hydrogen, methyl, trifluoromethyl, methoxy, chloro and nitro, and Z is selected from the group consisting of hydrogen and $C_{1-3}$ alkyl.

4. Compound according to claim 1 wherein such compound is 4-(N-fluorodichloromethylmercapto-N-trifluoromethylamino)-benzoic acid 2'-carboxy-phenyl ester of the formula

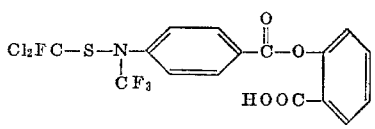

5. Compound according to claim 1 wherein such compound is 3-(N-fluorodichloromethylmercapto-N-trifluoromethylamino)-benzoic acid 2'-carboxy-phenyl ester of the formula

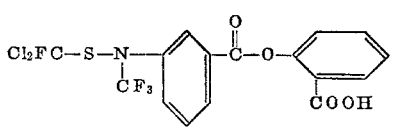

6. Compound according to claim 1 wherein such compound is 3-(N-fluorodichloromethylmercapto-N-trifluoromethylamino)-4-methyl-benzoic acid 2'-carboxyl-phenyl ester of the formula

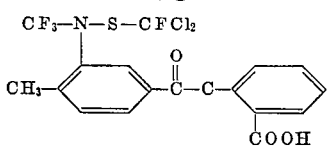

7. Compound according to claim 1 wherein such compound is 3-trifluoromethyl-4-(N-fluorodichloromethylmercapto-N-trifluoromethylamino)-benzoic acid 2'-carboxyphenyl ester of the formula

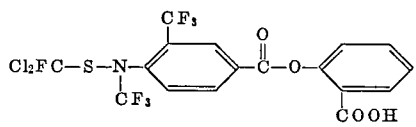

8. Compound according to claim 1 wherein such compound is 2-(N-fluorodichloromethylmercapto-N-trifluoromethylamino) - 4 - chloro-benzoic acid 2'-carboxy-phenyl ester of the formula

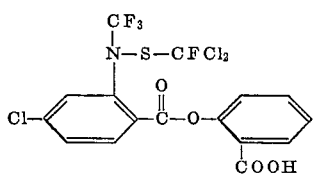

9. Compound according to claim 1 wherein such compound is 3-(N-fluorodichloromethylmercapo-N-trifluoromethylamino)-benzoic acid 3'-carboxy-phenyl ester of the formula

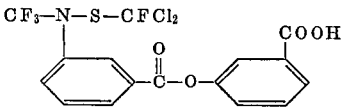

10. Compound according to claim 1 wherein such compound is 3-(N-fluorodichloromethylmercapto-N-trifluoromethylamino)-benzoic acid 2' - methoxycarbonyl - phenyl ester of the formula

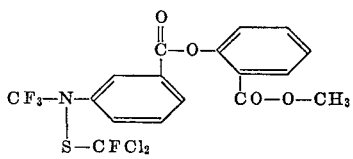

References Cited

FOREIGN PATENTS 1,193,498    2/1966    Germany.

LORRAINE A. WEINBERGER, Primary Examiner

J. F. TERAPANE, Assistant Examiner

U.S. Cl. X.R.

260—544 F; 424—310